United States Patent
Black et al.

(10) Patent No.: US 11,050,767 B2
(45) Date of Patent: Jun. 29, 2021

(54) SYSTEM FOR IDENTIFYING AND HANDLING ELECTRONIC COMMUNICATIONS FROM A POTENTIALLY UNTRUSTWORTHY SENDING ENTITY

(71) Applicant: Forcepoint, LLC, Austin, TX (US)

(72) Inventors: Robert B. Black, Austin, TX (US); Harish Nair, Austin, TX (US); He Yin, Round Rock, TX (US)

(73) Assignee: Forcepoint, LLC, Austin, TX (US)

( * ) Notice: Subject to any disclaimer, the term of this patent is extended or adjusted under 35 U.S.C. 154(b) by 23 days.

(21) Appl. No.: 16/222,483

(22) Filed: Dec. 17, 2018

(65) Prior Publication Data

US 2020/0195662 A1     Jun. 18, 2020

(51) Int. Cl.
*H04L 29/06* (2006.01)
*H04L 29/08* (2006.01)
*H04L 12/58* (2006.01)
*G06Q 50/00* (2012.01)

(52) U.S. Cl.
CPC ......... *H04L 63/1416* (2013.01); *G06Q 50/01* (2013.01); *H04L 51/32* (2013.01); *H04L 63/126* (2013.01); *H04L 67/306* (2013.01)

(58) Field of Classification Search
CPC ... H04L 63/126; H04L 51/32; H04L 63/1416; H04L 67/306; G06Q 50/01
See application file for complete search history.

(56) References Cited

U.S. PATENT DOCUMENTS

| | | |
|---|---|---|
| 7,574,740 B1 | 8/2009 | Kennis |
| 7,882,538 B1 | 2/2011 | Palmer |
| 8,230,505 B1 | 7/2012 | Ahrens et al. |
| 2002/0078382 A1 | 6/2002 | Sheikh et al. |
| 2003/0145225 A1 | 7/2003 | Bruton et al. |
| 2003/0145226 A1 | 7/2003 | Bruton et al. |

(Continued)

OTHER PUBLICATIONS

Song et al., "Spam Filtering in Twitter Using Sender-Receiver Relationship", Sep. 2011, RAID'11: Proceedings of the 14th international conference on Recent Advances in Intrusion Detection, pp. 301-317 (Year: 2011).*

(Continued)

*Primary Examiner* — Thaddeus J Plecha
(74) *Attorney, Agent, or Firm* — Terrile, Cannatti & Chambers; Stephen A. Terrile

(57) ABSTRACT

A method, system and computer-usable medium for identifying communications received from potentially untrustworthy entities. More specifically, in one embodiment the invention relates to a computer-implemented method comprising: receiving an electronic communication for a receiving entity from a sending entity; accessing social media profile information for the sending entity from a social media network; and analyzing the social media profile information of the sending entity pursuant to determining whether the received electronic communication is from a potentially untrustworthy entity. Certain embodiments use the determination as to whether the received electronic communication is from a potentially untrustworthy entity to assess whether the received electronic communication is a reconnaissance communication, such as a phishing email.

22 Claims, 10 Drawing Sheets

(56) References Cited

U.S. PATENT DOCUMENTS

| | | |
|---|---|---|
| 2003/0188189 A1 | 10/2003 | Desai et al. |
| 2005/0138402 A1 | 6/2005 | Yoon et al. |
| 2005/0171954 A1* | 8/2005 | Hull .................. H04L 51/32 |
| 2006/0085543 A1 | 4/2006 | Hrastar et al. |
| 2006/0117172 A1 | 6/2006 | Zhang et al. |
| 2008/0082722 A1 | 4/2008 | Savagaonkar et al. |
| 2009/0249466 A1 | 10/2009 | Motil et al. |
| 2009/0254572 A1 | 10/2009 | Redlich et al. |
| 2010/0010968 A1 | 1/2010 | Redlich et al. |
| 2013/0080641 A1 | 3/2013 | Lui et al. |
| 2013/0124644 A1* | 5/2013 | Hunt .................. H04L 51/32 709/206 |
| 2013/0231084 A1 | 9/2013 | Raleigh |
| 2013/0275574 A1 | 10/2013 | Hugard, IV et al. |
| 2013/0298192 A1 | 11/2013 | Kumar et al. |
| 2014/0198958 A1 | 7/2014 | Nathan et al. |
| 2015/0066896 A1 | 3/2015 | Davis et al. |
| 2015/0261969 A1 | 9/2015 | Frost |
| 2016/0014070 A1* | 1/2016 | Adkins .................. H04L 51/12 709/206 |
| 2016/0042179 A1 | 2/2016 | Weingarten et al. |
| 2016/0055334 A1 | 2/2016 | Herwono et al. |
| 2016/0148019 A1 | 5/2016 | Rambler et al. |
| 2017/0126718 A1 | 5/2017 | Baradaran et al. |
| 2017/0149795 A1 | 5/2017 | Day, II |
| 2017/0214705 A1 | 7/2017 | Gupta |
| 2017/0244729 A1 | 8/2017 | Fahrny et al. |
| 2017/0244762 A1* | 8/2017 | Kinder .................. H04L 63/1441 |
| 2017/0302822 A1 | 10/2017 | Vandeweerd et al. |
| 2017/0329966 A1 | 11/2017 | Koganti et al. |
| 2018/0174138 A1* | 6/2018 | Subbarayan ....... G06Q 20/3674 |
| 2019/0034625 A1 | 1/2019 | Ford et al. |
| 2019/0124117 A1 | 4/2019 | Swafford |
| 2019/0124118 A1 | 4/2019 | Swafford |
| 2019/0213401 A1* | 7/2019 | Kuang .................. A01K 15/021 |
| 2019/0370851 A1* | 12/2019 | Haddadnia ......... G06Q 30/0244 |
| 2020/0074481 A1* | 3/2020 | Zhang ................ G06Q 30/0205 |
| 2020/0134192 A1 | 4/2020 | Gupta et al. |
| 2020/0234243 A1 | 7/2020 | Miron et al. |
| 2020/0242260 A1 | 7/2020 | Chen et al. |
| 2020/0257821 A1 | 8/2020 | Lai |
| 2020/0257822 A1 | 8/2020 | Ford et al. |
| 2020/0257823 A1 | 8/2020 | Ford et al. |

OTHER PUBLICATIONS symantec.com, Which tuning is available for improving the performance of Symantec Endpoint Protection clients during scan, https://support.symantec.com/en_US/article.TECH143941.html, Jan. 6, 2011.

microsoft.com, Windows Search Overview, https://msdn.microsoft.com/en-us/library/windows/desktop/aa965362, printed Nov. 20, 2017.

Stephen G. Dimmock et al., Is Fraud Contagious? Co-Worker Influence on Misconduct by Financial Advisers, The Journal of Finance, first published online Feb. 3, 2018.

Thomas R. Hurd et al., A framework for analyzing contagion in assortative banking networks, PLoS One 12(2): e0170579, 2017.

SANS ISC InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike+Domains/22310/.

* cited by examiner

SYSTEM FOR IDENTIFYING AND HANDLING ELECTRONIC COMMUNICATIONS FROM A POTENTIALLY UNTRUSTWORTHY SENDING ENTITY

BACKGROUND OF THE INVENTION

Field of the Invention

The present invention relates in general to the field of computers and similar technologies, and in particular to software utilized in this field. Still more particularly, it relates to a method, system and computer-usable medium for identifying and handling communications from a potentially untrustworthy sender.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

There are several manners by which a threat actor may infiltrate a network. This can be done through, for example, a phishing email, malicious attachment, or exploitation of an application vulnerability. Often, the threat actor attempts to plant malware on the network to, for example, exfiltrate data, compromise system resources, install malware, etc. Network security systems must detect such threats and handle the threats to mitigate their effects on the network.

SUMMARY OF THE INVENTION

A method, system and computer-usable medium for identifying communications received from potentially untrustworthy entities. More specifically, in one embodiment the invention relates to a computer-implemented method comprising: receiving an electronic communication for a receiving entity from a sending entity; accessing social media profile information for the sending entity from a social media network; and analyzing the social media profile information of the sending entity pursuant to determining whether the received electronic communication is from a potentially untrustworthy entity.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving an electronic communication for a receiving entity from a sending entity; accessing social media profile information for the sending entity from a social media network; and analyzing the social media profile information of the sending entity pursuant to determining whether the received electronic communication is from a potentially untrustworthy entity.

In another embodiment the invention relates to a computer-readable storage medium embodying computer program code, the computer program code comprising computer executable instructions configured for: receiving an electronic communication for a receiving entity from a sending entity; accessing social media profile information for the sending entity from a social media network; and analyzing the social media profile information of the sending entity pursuant to determining whether the received electronic communication is from a potentially untrustworthy entity.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
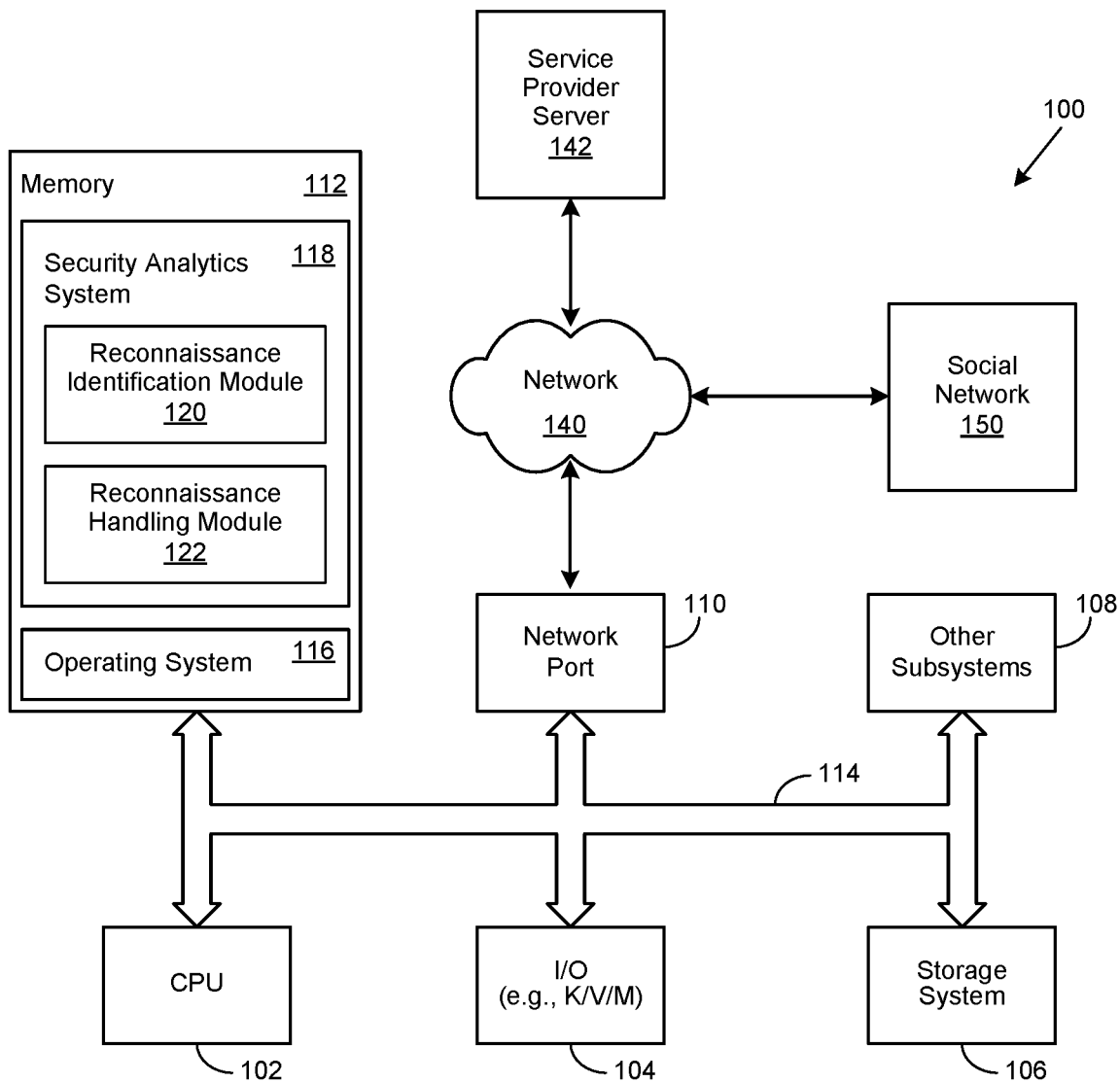
FIG. 1 depicts an exemplary client computer in which the present invention may be implemented.

A method, system and computer-usable medium for identifying and handling communications received from a potentially untrustworthy entity. Although the principles of the present disclosure may be extended to identification of communications received from any untrustworthy entity, the system and methods set forth herein discuss such principles in the context of reconnaissance communications. Such communications may include phishing emails sent to a receiving entity for reconnaissance purposes in order to exploit security vulnerabilities of the security system. The disclosed reconnaissance communication detection and handling system may be used as a stand-alone system or may supplement existing reconnaissance identification systems.

In certain embodiments, the disclosed system may operate in the context of an Advanced Persistent Threat (APT). In certain instances, an APT occurs over time and may follow a number of steps, including one or more of:

1. The threat actor infiltrates the network. This can be done through a phishing email, malicious attachment or application vulnerability and usually involves planting malware somewhere onto the network.

2. The malicious software probes for vulnerabilities or communicates with external command-and-control (CnC) servers for further instructions or additional code.
3. Additional points of compromise are often established by the malware to ensure that the attack can still continue if a specific entry point or vulnerability is closed or strengthened.
4. Once a cybercriminal has determined that they have established successful access to the network, they can get to work. This might involve gathering account names and passwords, stealing confidential files, or deleting data.
5. A staging server is used by the malware to collect data. This data is then exfiltrated under the control of the threat actor onto an external server. At this point, a total breach of the network may have occurred, although the threat actor will do all they can to cover their tracks and remove any evidence so the threat actor can come and repeat the process in future attempts.

Certain aspects of the invention include an appreciation that it is often difficult to identify electronic communications that have been sent to specific individuals (i.e., targets) for reconnaissance purposes when the communication does not include detectable malware, suspicious attachments, redirected website links, etc. The reconnaissance phase of an APT may involve gathering information about the target infrastructure through active and passive reconnaissance on the target systems, followed by vulnerability discovery through enumeration of specific details about a particular system, and gathering information about the human targets selected for the initial compromise phase (e.g. malware delivery though spear-phishing). Reconnaissance allows a malevolent actor to gain an initial foothold on a target system and collect further information in order to discover valuable assets by moving, for example, laterally within the target network.

Certain embodiments of the disclosed system include identifying a source of a communication, such as an email. In certain embodiments, social media networks are accessed to obtain profile information relating to the sending entity. In certain embodiments, the profile information is used to determine whether the communication has been sent from a potentially untrustworthy entity. In certain embodiments, communications sent by potentially untrustworthy entities are identified as reconnaissance communications that have been sent for reconnaissance or similar malevolent purposes. In certain embodiments, the determination as to whether the communication has been sent from a potentially untrustworthy entity may be made by certain embodiments of the disclosed system alone. In certain embodiments, the determination as to whether the communication has been sent by an untrustworthy source may be made by certain embodiments of the disclosed system along with other factors unrelated to the social profile of the sending entity. In certain embodiments, when a communication is received from a potentially untrustworthy entity, the communication may be quarantined and/or sandboxed. In certain embodiments, the receiving entity may be notified that a communication from an untrustworthy source has been received on their behalf In certain embodiments, receipt of a communication from an untrustworthy source may be used in assessing a risk profile for the receiving entity.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142 and a social network 150. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to identify and handle electronic communications received from a potentially untrustworthy sender. In certain embodiments, electronic communications from a potentially untrustworthy sender are treated as reconnaissance communications.

For purposes of the following examples, the security analytics system 118 is described in the context of a system configured to detect and handle reconnaissance communications, such as phishing emails. Accordingly, the example of the security analytics system 118 may be configured to include a reconnaissance identification module 120 and a reconnaissance handling module 122. In certain embodiments, the security analytics system 118 may be implemented to identify reconnaissance communications, such as reconnaissance phishing emails, using social networking profiles of the senders. In certain embodiments, the reconnaissance identification module 120 and the reconnaissance handling module 122 may be implemented alone or in conjunction with other reconnaissance identification operations of the security analytics system 118.

Figure 2:
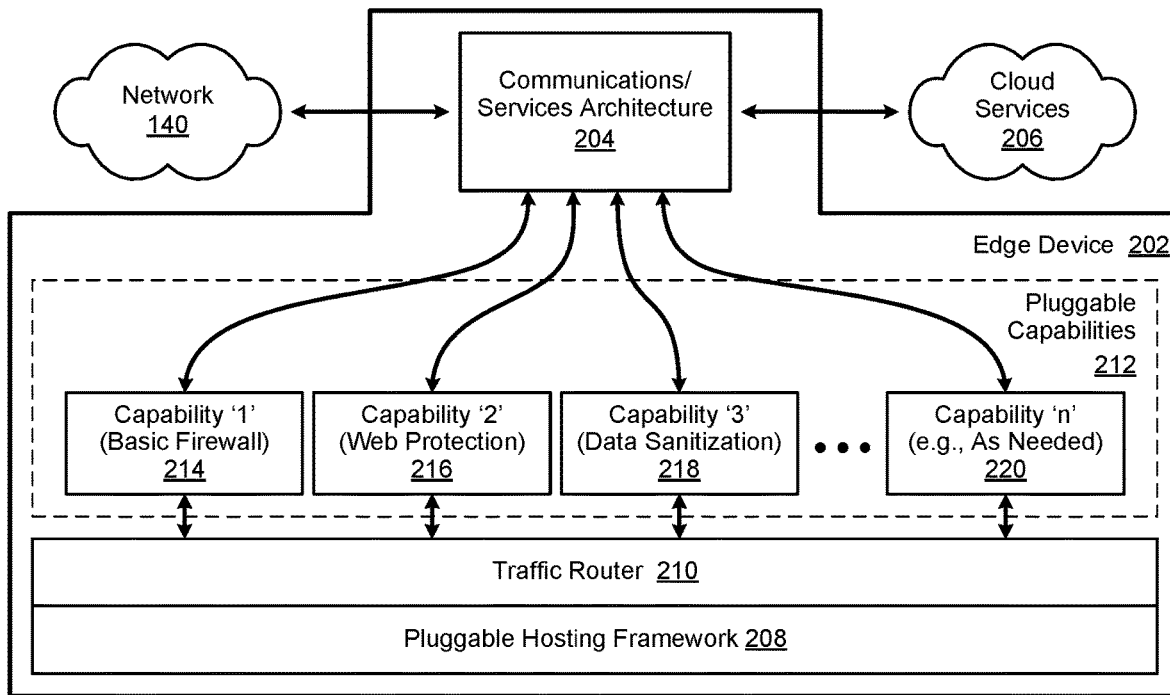
FIG. 2 is a simplified block diagram of an edge device.

FIG. 2 is a simplified block diagram of an edge device that may be used in certain electronic environments in which the present invention operates. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provide improved reliability, but enable enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
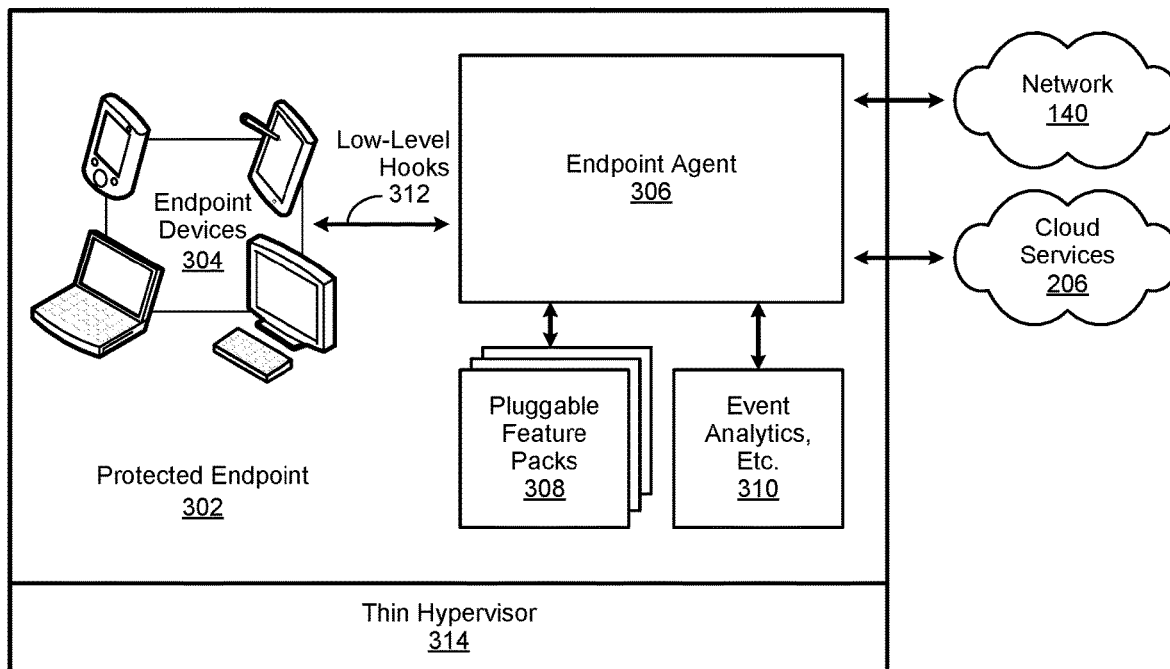
FIG. 3 is a simplified block diagram of an endpoint agent.

FIG. 3 is a simplified block diagram of an endpoint agent implemented in accordance with an embodiment of the disclosed system. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors 604. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
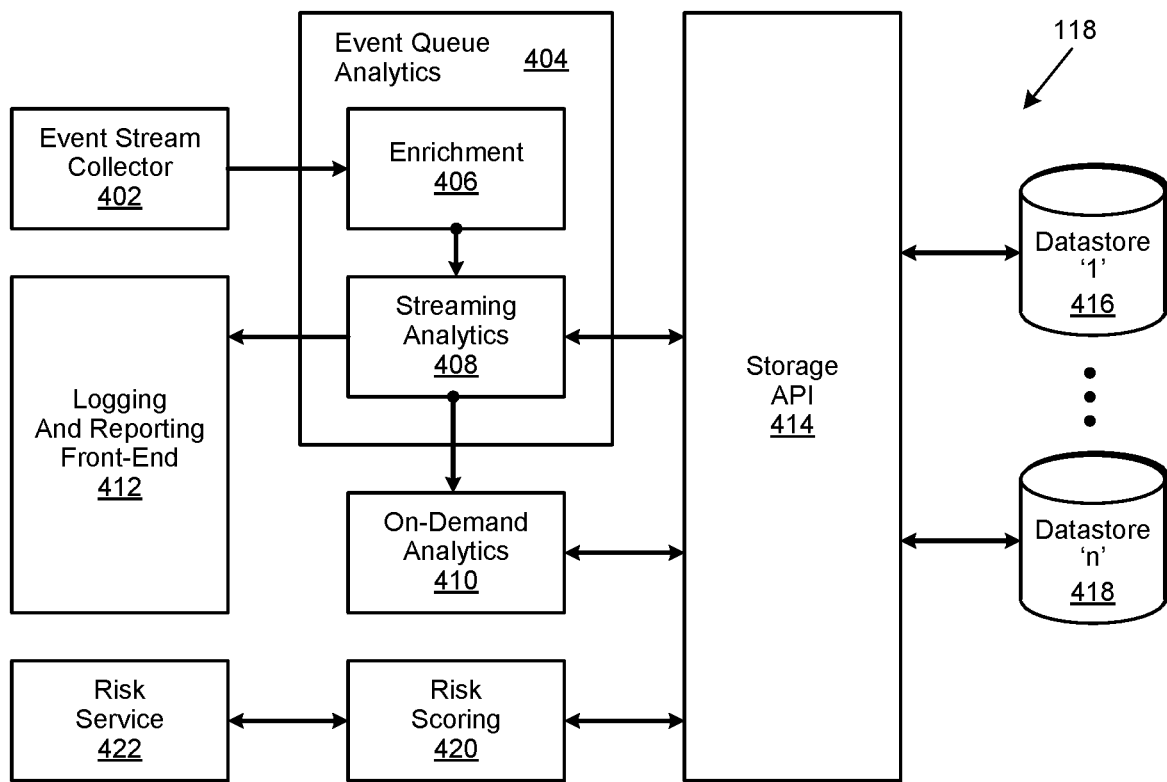
FIG. 4 is a simplified block diagram of a security analytics system implemented in certain embodiments of the disclosed system.

FIG. 4 is a simplified block diagram of a security analytics system implemented in certain embodiments of the disclosed system. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various user behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 406 to a streaming 408 analytics module. In turn, the streaming 408 analytics module may provide some or all of the enriched user behavior information to an on-demand 410 analytics module. As used herein, streaming 408 analytics broadly refers to analytics performed in near real-time on enriched user behavior information as it is received. Likewise, on-demand 410 analytics broadly refers herein to analytics performed, as they are requested, on enriched user behavior information after it has been received. In certain embodiments, the enriched user behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched user behavior associated with a particular interval of, or point in, time. In certain embodiments, the streaming 408 or on-demand 410 analytics may be performed on enriched user behavior associated with a particular user, group of users, one or more entities, or a combination thereof. In certain embodiments, the streaming 408 or on-demand 410 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing a user profile, as described in greater detail herein. In certain embodiments, the risk management service 422 may be implemented to perform operations associated with detecting anomalous, abnormal, unexpected or malicious user behavior and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
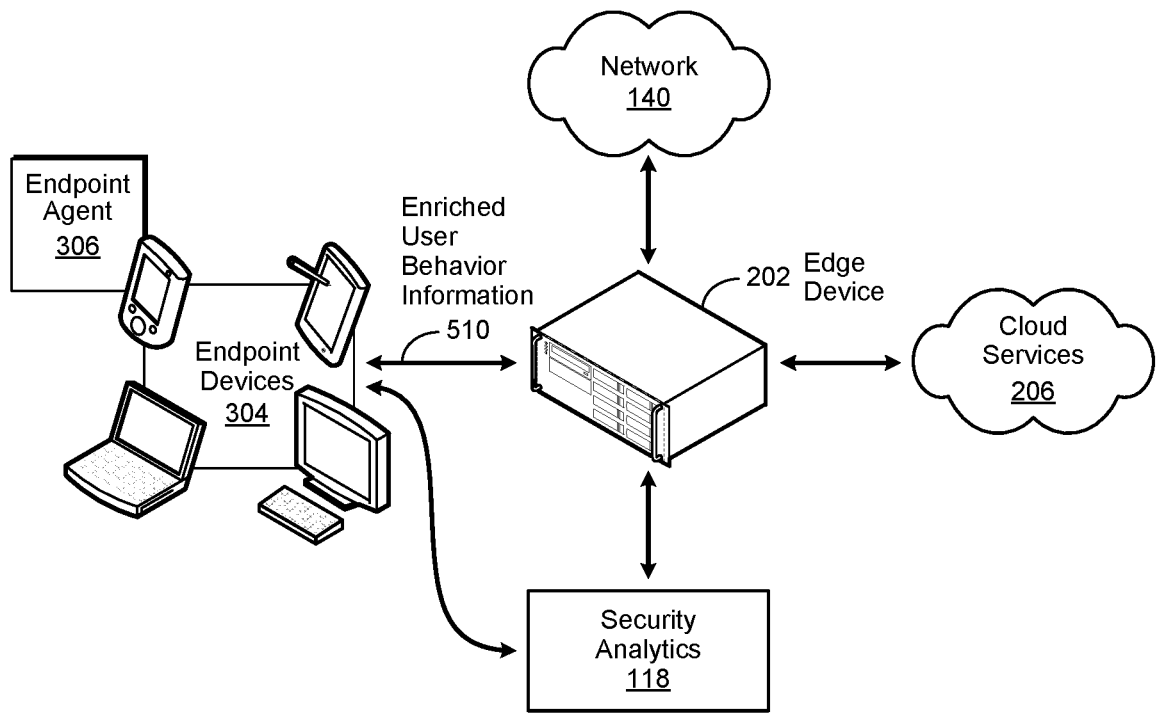
FIG. 5 is a simplified block diagram of one environment in which certain embodiments of the security analytics system may be implemented.

FIG. 5 is a simplified block diagram of one environment in which certain embodiments of the security analytics system may be implemented. In certain embodiments, the security analytics system 118 may be implemented to perform operations associated with detecting anomalous, abnormal, unexpected or malicious user behavior, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain user behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments set forth in the disclosure reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the systems set forth in this disclosure reflect an appreciation that such an approach works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the system set forth in this disclosure reflect an appreciation that such an approach is highly applicable to defending against point-of-sale (POS) malware, a breach technique that has become increasingly more common in recent years. Certain embodiments of the system set forth in this disclosure likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. Certain embodiments of the system set forth in this disclosure reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6A:
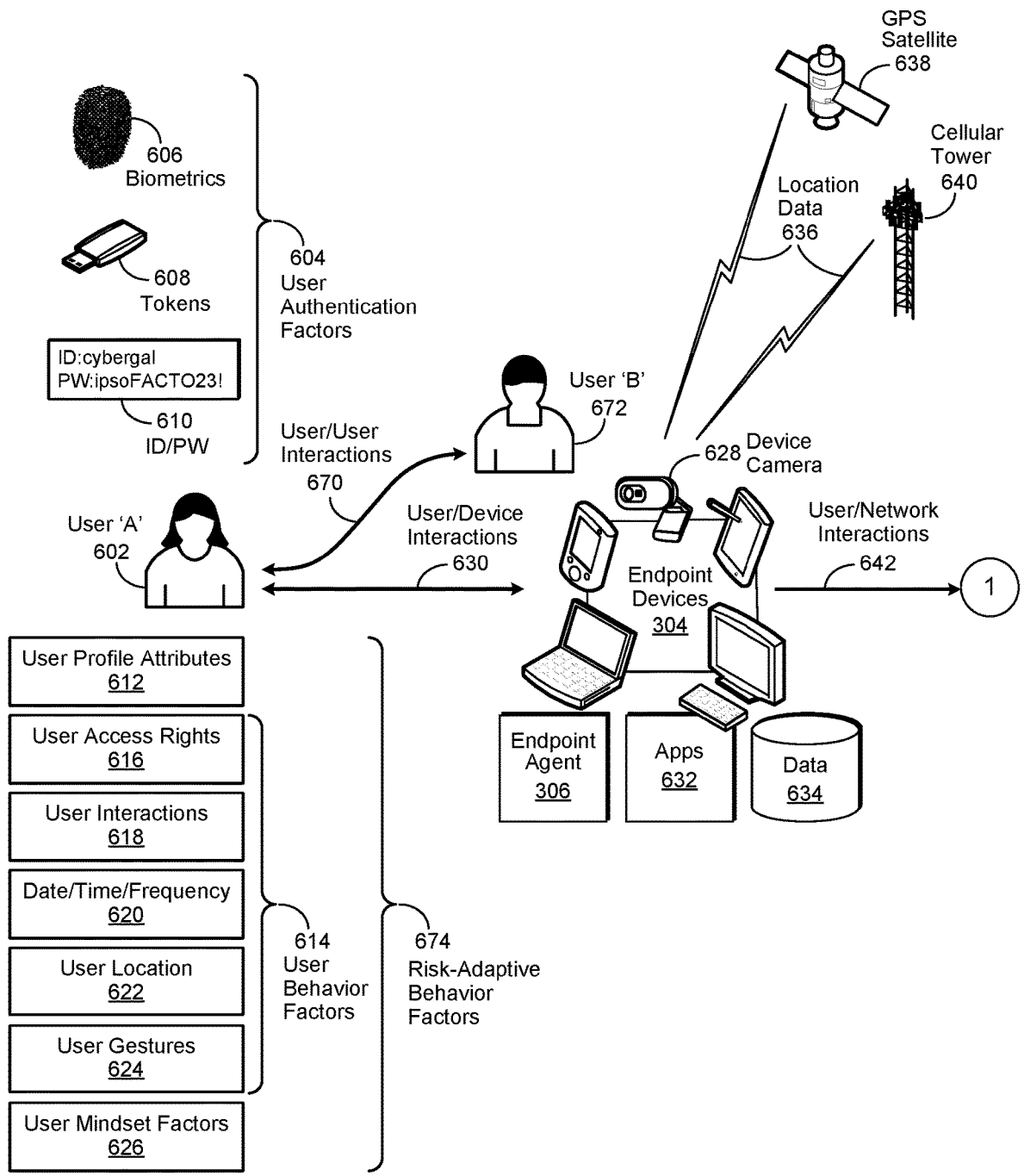
FIGS. 6a and 6b is a block diagram of another environment in which certain embodiments of a security analytics system may operate.
Figure 6B:
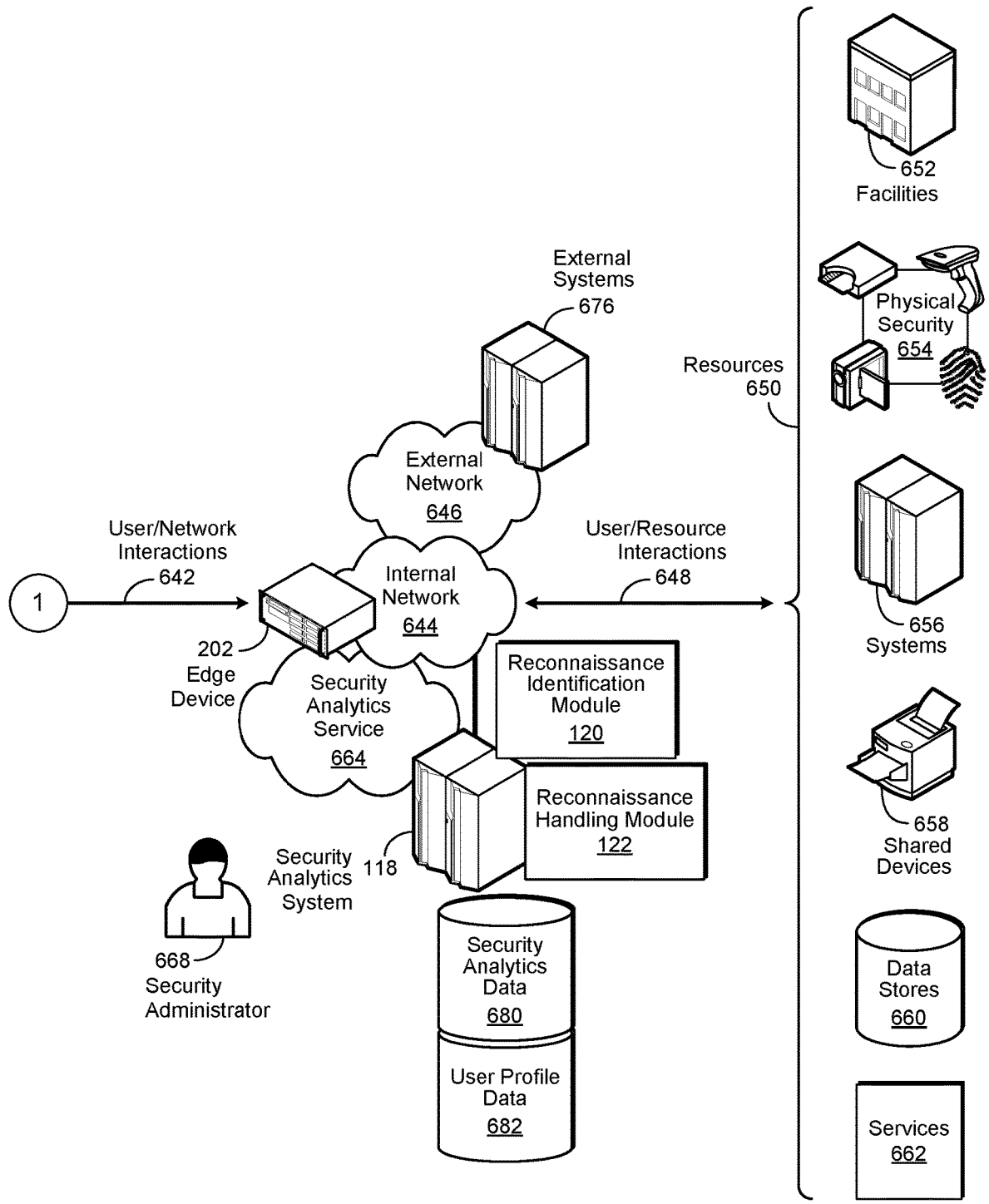

FIGS. 6*a* and 6*b* show a block diagram of a security analytics environment implemented in accordance with an embodiment of the invention. In certain embodiments, analyses performed by a security analytics system 118 may be used to identify anomalous, abnormal, unexpected or malicious behavior associated with an entity. In certain embodiments, the anomalous, abnormal, unexpected or malicious behavior may be identified at a particular point in time, during the occurrence of an event, the enactment of a user behavior, or a combination thereof.

As used herein, an entity broadly refers to something that exists as itself, whether physically or abstractly. In certain embodiments, an entity may be an individual user, a group, an organization, or a government. In certain embodiments, an entity may likewise be an item, a device, such as endpoint 304 and edge 202 devices, a network, such as an internal 644 and external 646 networks, a domain, an operation, or a process. In certain embodiments, an entity may be a resource 650, such as a geographical location or formation, a physical facility 652, such as a venue, various physical security devices 654, a system 656, shared devices 658, such as printer, scanner, or copier, a data store 660, or a service 662, such as a service 662 operating in a cloud environment or an external system 676.

For purposes of the disclosure of certain embodiments, a sending entity includes entities in that attempt to communicate with users using conventional communication methods, such as email, texting, messaging, etc. For purposes of the disclosure of certain embodiments, a receiving entity includes entities that are the target of communications sent from the sending entity.

As likewise used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

In certain embodiments, information associated with such user behavior may be stored in a user profile. As used herein, a user profile broadly refers to a collection of information that uniquely describes a user's identity and their associated behavior, whether the behavior occurs within a physical realm or cyberspace. In certain embodiments, the user profile may be stored in a repository of user profile data 682. In certain embodiments, as described in greater detail herein, the user profile may include user profile attributes 612, user behavior factors 614, user mindset factors 626, or a combination thereof.

As used herein, a user profile attribute 612 broadly refers to data or metadata that can be used, individually or in combination with other user profile attributes 612, to uniquely ascertain the identity of an entity. In certain embodiments, the user profile attributes 612 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, financial account information, such as credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604.

In certain embodiments, the user authentication factors 604 may be used to authenticate the identity of a user, such as user 'A' 602 or 'B' 672. In certain embodiments, the user authentication factors 604 may be used to ensure that a particular user, such as user 'A' 602 or 'B' 672, is associated with their corresponding user profile, rather than a user profile associated with another user. In certain embodiments, the user authentication factors 604 may include a user's biometrics 606 (e.g., a fingerprint or retinal scan), tokens 608 (e.g., a dongle containing cryptographic keys), user identifiers and passwords (ID/PW) 610, and personal identification numbers (PINs).

As used herein, a user behavior factor 614 broadly refers to information associated with a user's behavior, whether the behavior occurs within a physical realm or cyberspace. In certain embodiments, the user behavior factors 614 may include the user's access rights 616, the user's interactions 618, and the date/time/frequency 620 of those interactions 618. In certain embodiments, the user behavior factors 614 may likewise include the user's location 622 when the interactions 618 are enacted, and the user gestures 624 used to enact the interactions 618.

In certain embodiments, the user gestures 624 may include key strokes on a keypad, a cursor movement, a mouse movement or click, a finger swipe, tap, or other hand gesture, an eye movement, or some combination thereof. In certain embodiments, the user gestures 624 may likewise include the cadence of the user's keystrokes, the motion, force and duration of a hand or finger gesture, the rapidity and direction of various eye movements, or some combination thereof. In certain embodiments, the user gestures 624 may include various audio or verbal commands performed by the user.

In various embodiments, certain date/time/frequency 620 user behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 626, or a combination thereof, to one or more instants in time. As an example, user 'A' 602 may access a particular system 656 to download a customer list at 3:47 PM on Nov. 3, 2017. Analysis of their user behavior profile indicates that it is not unusual for user 'A' 602 to download the customer list on a weekly basis. However, examination of their user behavior profile also indicates that user 'A' 602 forwarded the downloaded customer list in an email message to user 'B' 672 at 3:49 PM that same day. Furthermore, there is no record in their user behavior profile that user 'A' 602 has ever communicated with user 'B' 672 in the past. Moreover, it may be determined that user 'B' 672 is employed by a competitor. Accordingly, the correlation of user 'A' 602 downloading the customer list at one point in time, and then forwarding the customer list to user 'B' 672 at a second point in time shortly thereafter, is an example of societal time.

In a variation of the prior example, user 'A' 602 may download the customer list at 3:47 PM on Nov. 3, 2017. However, instead of immediately forwarding the customer list to user 'B' 672, user 'A' 602 leaves for a two week vacation. Upon their return, they forward the previously-downloaded customer list to user 'B' 672 at 9:14 AM on Nov. 20, 2017. From an ontological time perspective, it has been two weeks since user 'A' 602 accessed the system 656 to download the customer list. However, from a societal time perspective, they have still forwarded the customer list to user 'B' 672, despite two weeks having elapsed since the customer list was originally downloaded.

Accordingly, the correlation of user 'A' 602 downloading the customer list at one point in time, and then forwarding the customer list to user 'B' 672 at a much later point in time, is another example of societal time. More particularly, it may be inferred that the intent of user 'A' 602 did not change during the two weeks they were on vacation. Furthermore, user 'A' 602 may have attempted to mask an intended malicious act by letting some period of time elapse between the time they originally downloaded the customer list and when they eventually forwarded it to user 'B' 672. From the foregoing, those of skill in the art will recognize that the use of societal time may be advantageous in determining whether a particular user behavior is acceptable, anomalous, abnormal, unexpected or malicious.

As used herein, mindset factors 626 broadly refer to information used to determine the mental state of a user at a particular point in time, during the occurrence of an event, an enactment of a user behavior, or combination thereof. As used herein, mental state broadly refers to a hypothetical state corresponding to the way a user may be thinking or feeling. In certain embodiments, the user mindset factors 626 may include a personality type. Examples of known approaches for determining a personality type include Jungian types, Myers-Briggs type indicators, Keirsy Temperament Sorter, Socionics, Enneagram of Personality, and Eyseneck's three-factor model.

In certain embodiments, the mindset factors 626 may include various behavioral biometrics. As likewise used herein, a behavioral biometric broadly refers to a physiological indication of a user's mental state. Examples of behavioral biometrics may include a user's blood pressure, heart rate, respiratory rate, eye movements and iris dilation, facial expressions, body language, tone and pitch of voice, speech patterns, and so forth.

In certain embodiments, the security analytics system 118 may be implemented to process certain entity information associated with providing resolution of the identity of an entity at a particular point in time. As likewise used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain entity identifier types or classifications.

In various embodiments, the security analytics system 118 may be implemented to use certain entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors 604, user profile attributes 612, location data 636, information associated with various endpoint 304 and edge 202 devices, internal 644 and external 646 networks, resource entities 650, or a combination thereof.

In certain embodiments, the entity identifier information may include temporal information. As used herein, temporal information broadly refers to a measure of time (e.g., a date, timestamp, etc.), a measure of a duration of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device 304, accessing a system 656, interacting with a physical security device 654 or shared devices 658, and entering a physical facility 652. Other examples of temporal events include uploading, transferring, downloading, modifying, or deleting data, such as data stored in a datastore 660, or accessing a service 662. Yet other examples of temporal events include user/user 670 interactions between two or more users, user/device 630 interactions between a user and a device, user/network 642 interactions between a user and a network, and user/resource 648 interactions between a user and a resource 650, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the security analytics system 118 may be implemented to use information associated with such temporal resolution of an entity's identity to assess the risk associated with a particular entity, at a particular point in time, and adaptively respond with an associated response. In certain embodiments, the security analytics system 118 may be implemented to respond to such assessments in order to reduce operational overhead and improve system efficiency while maintaining security integrity. In certain embodiments, the response to such assessments may be performed by a security administrator 668. Accordingly, certain embodiments of the system set forth in this disclosure may be directed towards assessing the risk associated with the affirmative resolution of the identity of an entity at a particular point in time in combination with its associated contextual information. Consequently, the security analytics system 118 may be more oriented in various embodiments to risk adaptation than to security administration.

In certain embodiments, the security analytics system 118 may be implemented to use information associated with certain user behavior elements to resolve the identity of an entity at a particular point in time. A user behavior element, as used herein, broadly refers to a discrete element of a user's behavior during the performance of a particular operation in a physical realm, cyberspace, or a combination thereof. In certain embodiments, such user behavior elements may be associated with a user/device 630, a user/network 642, a user/resource 648, a user/user 670 interaction, or a combination thereof.

As an example, user 'A' 602 may use an endpoint device 304 to browse a particular web page on a news site on the Internet. In this example, the individual actions performed by user 'A' 602 to access the web page are user behavior elements that constitute a user behavior. As another example, user 'A' 602 may use an endpoint device 304 to download a data file from a particular system 656. In this example, the individual actions performed by user 'A' 602 to download the data file, including the use of one or more user authentication factors 604 for user authentication, are user behavior elements that constitute a user behavior. In certain embodiments, the user/device 630 interactions may include an interaction between a user, such as user 'A' 602 or 'B' 672, and an endpoint device 304.

In certain embodiments, the user/device 630 interaction may include interaction with an endpoint device 304 that is not connected to a network at the time the interaction occurs. As an example, user 'A' 602 or 'B' 672 may interact with an endpoint device 304 that is offline, using applications 632, accessing data 634, or a combination thereof, it may contain. Those user/device 630 interactions, or their result, may be stored on the endpoint device 304 and then be accessed or retrieved at a later time once the endpoint device 304 is connected to the internal 644 or external 646 networks. In certain embodiments, an endpoint agent 306 may be implemented to store the user/device 630 interactions when the user device 304 is offline.

In certain embodiments, an endpoint device 304 may be implemented with a device camera 628. In certain embodiments, the device camera 628 may be integrated into the endpoint device. In certain embodiments, the device camera 628 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 628 may be implemented to capture provide user/device 630 interaction information to an endpoint agent 306. In various embodiments, the device camera 628 may be implemented to provide surveillance information related to certain user/device 630 or user/user 670 interactions. In certain embodiments, the surveillance information may be used by the security analytics system 118 to detect anomalous, abnormal, unexpected or malicious behavior associated with an entity, such as user 'A' 602 or user 'B' 672. In certain embodiments, the entity may or may not be aware that the camera is providing such surveillance information.

In certain embodiments, the endpoint device 304 may be used to communicate data through the use of an internal network 644, an external network 646, or a combination thereof. In certain embodiments, the internal 644 and the external 646 networks may include a public network, such as the Internet, a physical private network, a virtual private network (VPN), or any combination thereof. In certain embodiments, the internal 644 and external 646 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 670 interactions may include interactions between two or more users, such as user 'A' 602 and 'B' 662. In certain embodiments, the user/user interactions 670 may be physical, such as a face-to-face meeting, via a user/device 630 interaction, a user/network 642 interaction, a user/resource 648 interaction, or some combination thereof. In certain embodiments, the user/user 670 interaction may include a face-to-face verbal exchange. In certain embodiments, the user/user 670 interaction may include a written exchange, such as text written on a sheet of paper. In certain embodiments, the user/user 670 interaction may include a face-to-face exchange of gestures, such as a sign language exchange.

In certain embodiments, temporal event information associated with various user/device 630, user/network 642, user/resource 648, or user/user 670 interactions may be collected and used to provide real-time resolution of the identity of an entity at a particular point in time. Those of skill in the art will recognize that many such examples of user/device 630, user/network 642, user/resource 648, and user/user 670 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint 304 or edge 202 device, a physical security device 654, a system 656, a shared device 658, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 656 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 636. In certain embodiments, the endpoint device 304 may be configured to receive such location data 636, which is used as a data source for determining the user's location 622. In certain embodiments, the location data 636 may include Global Positioning System (GPS) data provided by a GPS satellite 638. In certain embodiments, the location data 636 may include location data 636 provided by a wireless network, such as from a cellular network tower 640. In certain embodiments (not shown), the location data 636 may include various Internet Protocol (IP) or other network address information assigned to the endpoint 304 or edge 202 device. In certain embodiments (also not shown), the location data 636 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 652, physical security device 654, system 656, or shared device 658. As an example, the endpoint device 304 may be directly connected to an ingress/egress system, such as an electronic lock on a door or an access gate of a parking garage. As another example, the endpoint device 304 may be indirectly connected to a physical security device 654 through a dedicated security network.

In certain embodiments, the security analytics system 118 may be implemented to perform various risk-adaptive protection operations. Risk-adaptive, as used herein, broadly refers to adaptively responding to a risk associated with an electronically-observable user behavior. In various embodiments, the security analytics system 118 may be implemented to perform certain risk-adaptive protection operations by monitoring certain user behaviors, assess the corresponding risk they may represent, individually or in combination, and respond with an associated response. In certain embodiments, such responses may be based upon contextual information, described in greater detail herein, associated with a given user behavior.

In certain embodiments, various risk-adaptive behavior factors 674, likewise described in greater detail herein, may be used to perform the risk-adaptive protection operations. In certain embodiments, the risk-adaptive behavior factors 674 may include user profile attributes 612, user behavior factors 614, user mindset factors 626, or a combination thereof. In these embodiments, the risk-adaptive behavior factors 674 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 664. In certain embodiments, the security analytics service 664 may be implemented in a cloud environment familiar to those of skill in the art. In various embodiments, the security analytics system 118 may use data stored in a repository of security analytics data 680 in the performance of certain security analytics operations, described in greater detail herein. In certain embodiments, the security analytics system 118 may include the reconnaissance identification module 120 and reconnaissance handling module 122, the operation of which is disclosed in more detail herein. Those of skill in the art will recognize that many such embodiments are possible. Accordingly, the foregoing is not intended to limit the spirit, scope or intent of the disclosure.

Figure 7:
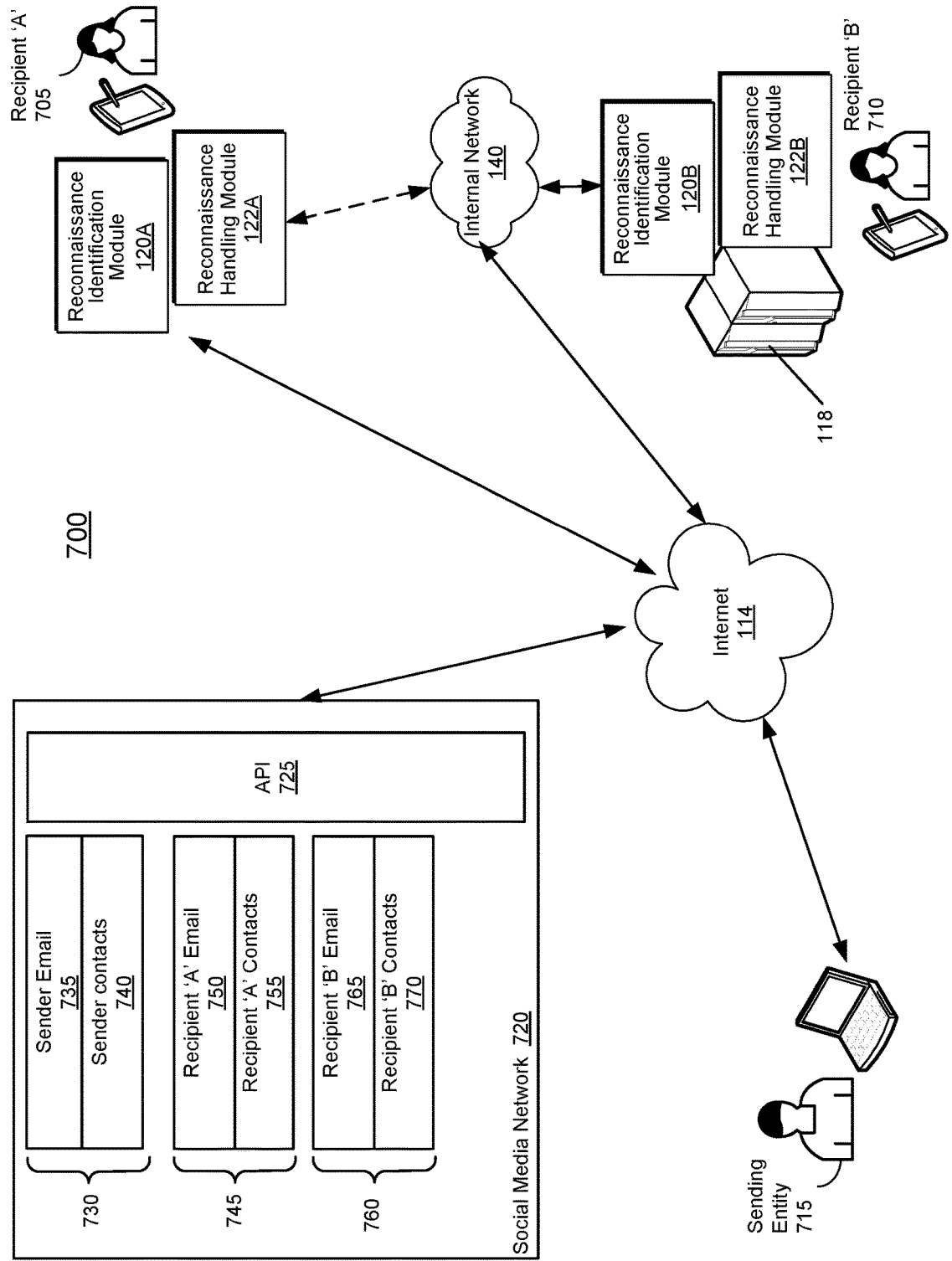
FIG. 7 depicts a simplified electronic environment in which certain embodiments of a reconnaissance identification module and reconnaissance handling module may operate.

FIG. 7 depicts a simplified electronic environment 700 in which certain embodiments of the reconnaissance identification module 120 and reconnaissance handling module 122 may operate. In certain embodiments, a reconnaissance identification module 120A and reconnaissance handling module 122A are associated with a recipient, such as Recipient 'A' 705 and may be implemented at the recipient's endpoint device. In certain embodiments, a reconnaissance identification module 120B and reconnaissance handling module 122B may be implemented as part of the security analytics system 118 of an internal network 140 to check for reconnaissance communications sent to a system user, such as Recipient 'B.' In certain embodiments, reconnaissance identification modules and reconnaissance handling modules are disposed at user endpoints as well as within the security analytics system 118 of the internal network 140.

In certain embodiments, a sending entity 715 sends an electronic communication to Recipient 'A' 705 over the Internet 114. For purposes of the illustrated example, it is assumed that the electronic communication is in the form of an email. However, it will be recognized by those skilled in the art, based on the teachings of the present disclosure, that the principles described herein may apply to other forms of electronic communications such as, for example, text messages, social media messages, and any other electronic communications containing a reference to a sending entity that may be extracted for use in reconnaissance identification operations.

In certain embodiments, an email sent to Recipient 'A' 705 is received directly over the Internet 114 at an endpoint device having a reconnaissance identification module 120A and reconnaissance handling module 122A. In certain embodiments, the reconnaissance identification module 120A communicates over the Internet 114 with a social media network 720 through an API 725 implemented at the social media network 720. One example of a social media network 720 is LinkedIn®, which is a social media network principally directed toward businesses and business relationships. However, it will be recognized by those skilled in the art, based on the teachings of the present disclosure, that the principles of the present disclosure may be extended to other types of social media networks.

In certain embodiments, the reconnaissance identification module 120A utilizes social media information, such as social profile information 730 of the sending entity 715 to determine whether the email sent by the sending entity 715 is likely to be a reconnaissance email. In certain embodiments, the social media profile information 730 may include the sender's email 735 and information related to the sender's contacts 740. In certain embodiments, the reconnaissance identification module 120A also utilizes social media profile information 745 of Recipient 'A' 705, such as the recipient's email 750 and contact information 755 in the reconnaissance determination. In certain embodiments, the reconnaissance handling module 122A may communicate information relating to any communications that have been identified as likely reconnaissance candidates directly over the internal network 140 to the security analytics system 118. In certain embodiments, the reconnaissance handling module 122A may communicate information relating to any communications that have been identified as likely reconnaissance candidates to the security analytics system 118 over the Internet 114. In certain embodiments, the reconnaissance handling module 122A may execute operations to mitigate any threat posed by the reconnaissance candidate. Various ways in which certain embodiments may use the social media profile information 730 and 745 are set forth herein.

In certain embodiments, the social media information associated with the sending entity 715 may include a calculated score for the sending entity based on the sending entity's participation on the social media platform. In certain embodiments, the calculated score may include a Social Selling Index (SSI), which measures how effective the sending entity has been at establishing their professional brand, finding the right people, engaging with insights, and building relationships. In certain embodiments, the higher the score for the sending entity, the less likely that the sending entity is untrustworthy.

In certain embodiments, the sending entity 715 sends an email to Recipient 'B' 710 over the Internet 114, which is subsequently sent to the internal network 140. In certain embodiments, the email sent to Recipient 'B' 710 is received within the internal network 140 at a security analytics system 118 having a reconnaissance identification module 120B and reconnaissance handling module 122B. In certain embodiments, the reconnaissance identification module 120B communicates over the Internet 114 with the social media network 720 through the API 725. In certain embodiments, the reconnaissance identification module 120B utilizes social media profile information 730 of the sending entity 715 to determine whether the email sent by the sending entity 715 is likely to be a reconnaissance email. In certain embodiments, the reconnaissance identification module 120B also utilizes social media profile information 760 of Recipient 'B' 705, such as the recipient's email 765 and contact information 770 in the reconnaissance determination. In certain embodiments, the reconnaissance handling module 122B may communicate information relating to any communications that have been identified as likely reconnaissance candidates either directly or indirectly to the security analytics system 118. In certain embodiments, the reconnaissance handling module 122B may execute operations to mitigate any threat posed by the reconnaissance candidate.

Figure 8:
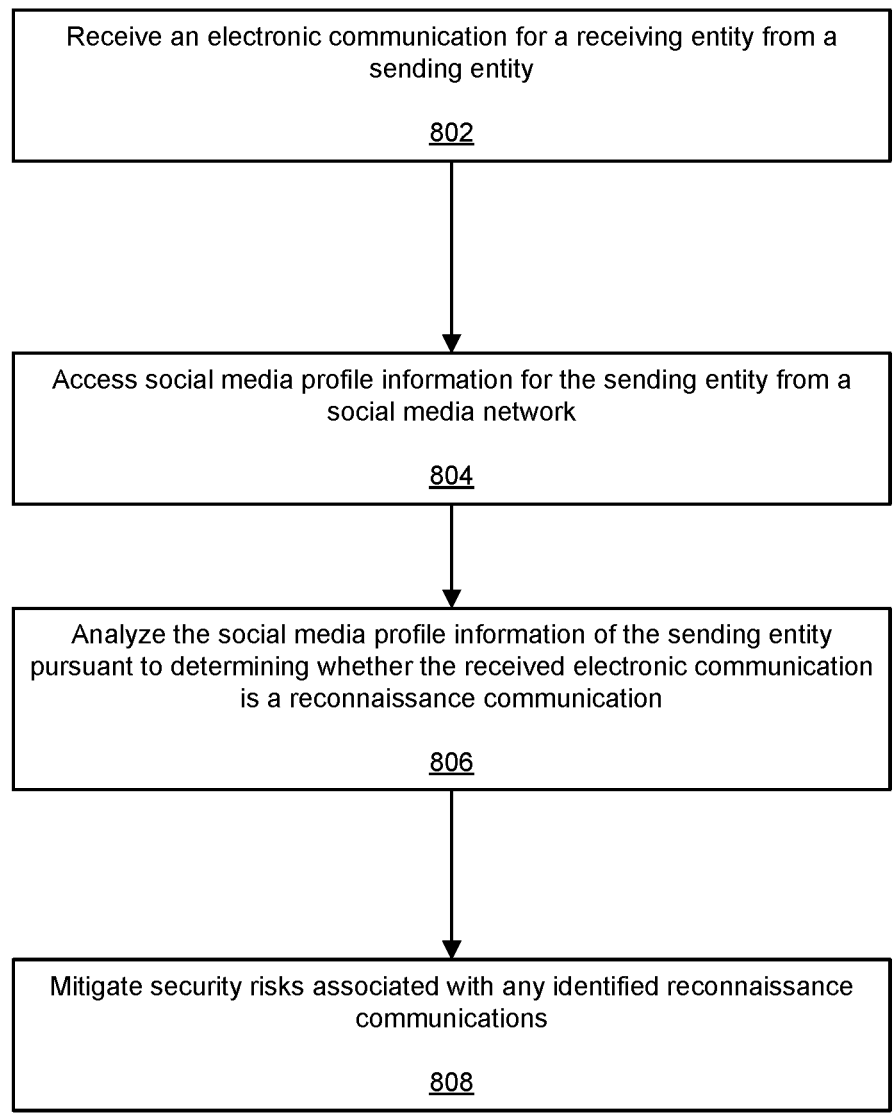
FIG. 8 is a flowchart depicting exemplary operations that may be executed by a reconnaissance identification module.

FIG. 8 is a flowchart depicting exemplary operations that may be executed by the reconnaissance identification module. In certain embodiments, the reconnaissance identification module receives an electronic communication for a receiving entity from a sending entity at operation 802. At operation 804, the reconnaissance identification module may access social media profile information for the sending entity from the social media network. Certain embodiments analyze the social media profile information of the sending entity at operation 806 pursuant to determining whether the received electronic communication is a reconnaissance communication. For purposes of the present disclosure, a determination as to whether the received electronic communication is a reconnaissance communication may include a determination as to whether the received electronic communication is from a potentially untrustworthy source. In certain embodiments, information relating to reconnaissance communications identified by the reconnaissance identification module 120 may be passed to the reconnaissance handling module 122, where the reconnaissance handling module 122 executes operations to mitigate security risks associated with the identified reconnaissance communication at operation 808. In certain embodiments, such mitigation operations may include quarantining the communication, sandboxing the communication, notifying a security administrator that a reconnaissance communication has been received, notifying the receiving entity that a reconnaissance communication has been received, providing options to one or both the security administrator and/or receiving entity as to how to handle the reconnaissance communication, etc.

Figure 9:
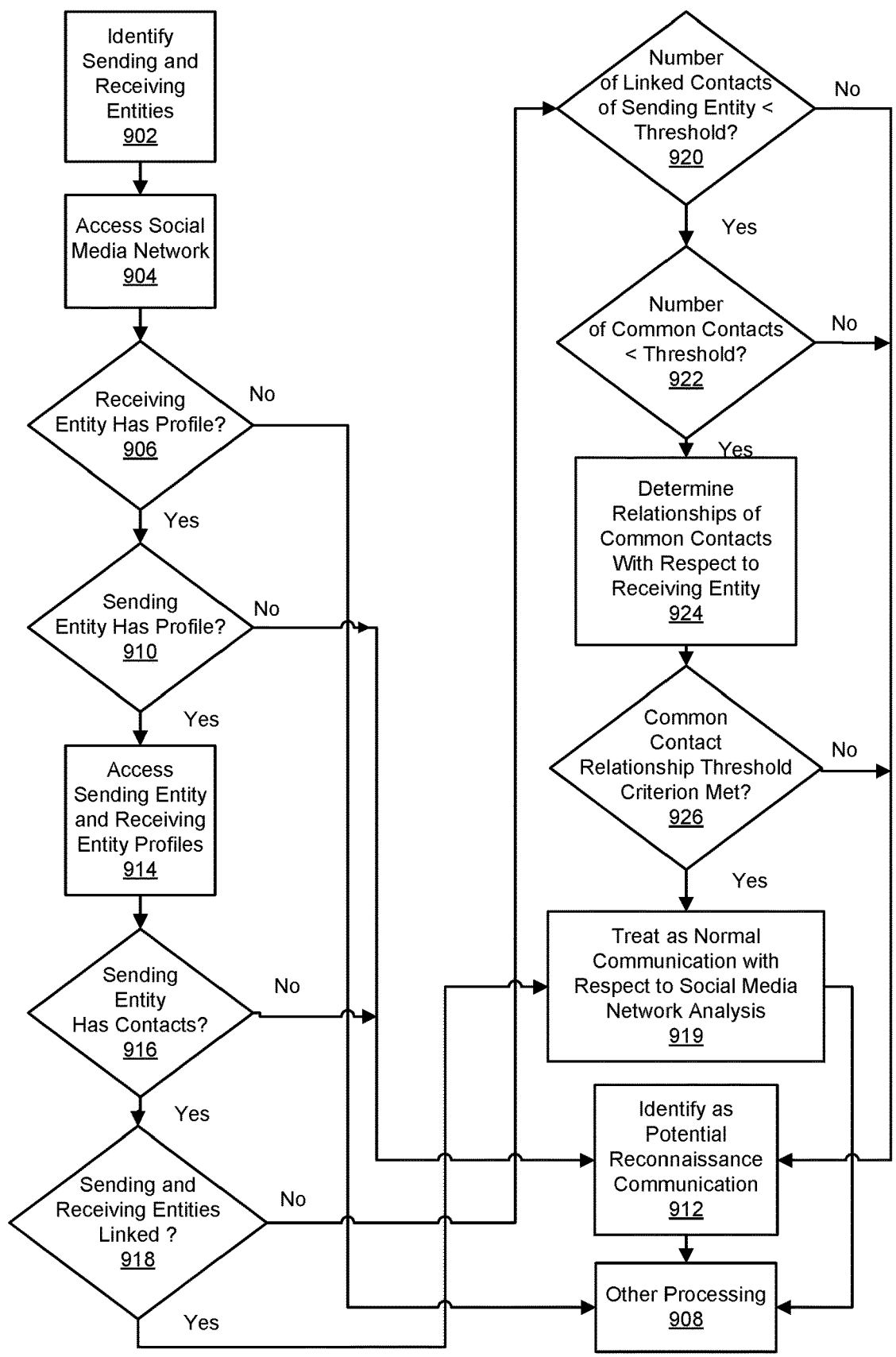
FIG. 9 depicts a flowchart of operations that may be executed by certain embodiments of the reconnaissance identification module.

FIG. 9 depicts a flowchart of operations that may be executed by certain embodiments of the reconnaissance identification module. In certain embodiments, the reconnaissance identification module may extract sending and receiving entities from the communication at operation 902. In certain embodiments, the sending and receiving entities are resolved before being provided to the reconnaissance identification module.

In certain embodiments, the reconnaissance identification module accesses a social media network at operation 904. In certain embodiments, the social media network may be principally directed to businesses and business relationships, such as LinkedIn®, having valuable business intelligence information. In certain embodiments, a determination as to whether the receiving entity has a social media profile on the social media network is made at operation 906. If the receiving entity does not have a social media profile, further processing of the communication without leveraging the information on the social media network may proceed at operation 908. In certain embodiments, however, may proceed to continue with the reconnaissance communication analysis without the benefit of a social media profile of the receiving entity and continue to operation 910 at which a determination is made as to whether the sending entity has a social media profile on the social media network. In certain embodiments, if the receiving entity has a social media profile at operation 906, the reconnaissance identification module may also proceed to operation 910. Often, an established business entity and/or individual associated with a business entity should have a social media profile. In certain embodiments, an absence of a social media profile for the sending entity may indicate that the received communication is not from a trustable source and, therefore, may be a reconnaissance communication. Accordingly, certain embodiments may identify the communication as a potential reconnaissance communication at operation 912 before proceeding to other processing at operation 908.

In certain embodiments, the reconnaissance identification module accesses both the social profile of the sending entity and social profile of the receiving entity at operation 914. In certain embodiments, a determination is made at operation 916 to determine whether the sending entity has contacts within the social media network. In certain embodiments, the absence of context for the sending entity may indicate that the sending entity is a bot, a new entity within the social media network generated for improper purposes, a new entity within the social media network that has not established itself over a sufficient period of time to indicate that the entity is trustworthy, etc. Under such circumstances, certain embodiments may identify the communication as a potential reconnaissance communication at operation 912. In certain embodiments, if the sending entity has contacts at operation 916, a determination may be made at operation 918 as to whether the sending and receiving entities are linked as contacts within the social media network. If the sending and receiving entities are linked, certain embodiments may proceed to operation 919 where the communication is treated as a normal communication with respect to social media network analysis. In certain embodiments, treatment as a normal communication is solely with respect to the social media network analysis and the communication may be subject to other processing at operation 908 for further processing to determine whether the communication is a reconnaissance communication. In certain embodiments, other processing at operation 908 may include any processing executed with respect to the received communication once the communication has been processed, at least in part, by the reconnaissance identification module.

If the sending and receiving entities are not linked as contacts within the social media network, certain embodiments may proceed to operation 920, where the reconnaissance identification module may determine whether the sending entity has a sufficient number of contacts within the social media network to indicate whether the sending entity may be trustworthy. In certain embodiments, operation 920 may compare the number of linked contacts of the sending entity with a threshold number. If the number of linked contacts fails to meet the threshold criterion at operation 920, the communication may be identified as a potential reconnaissance communication at operation 912. It will be recognized in view of the teachings of the present disclosure that operation 916 and operation 920 may be used in the alternative or combined as a single operation in certain embodiments.

If the number of linked contacts of the sending entity meets the threshold requirements, certain embodiments may proceed to operation 922 to determine whether the sending entity and receiving entity share any common contacts. In certain embodiments, a threshold criterion for the number of common contacts between the sending entity and receiving entity may be used at operation 922 to determine whether the sending entity may be trusted. If the threshold criterion is not met at operation 922, certain embodiments may identify the communication as a potential reconnaissance communication at operation 912.

If the threshold criterion is met at operation 922, certain embodiments may proceed to determine the relationships of the common contacts with respect to the receiving entity at operation 924. To this end, certain social media networks identify the degree of a relationship between entities in the social media network. In certain examples, entities that have established a one-on-one relationship between each other may be considered directly related and given a relationship status of "first-degree." In certain examples, such a first degree is established when a link request is sent by a first entity and accepted by a second entity. In certain examples, entities that have a common contact with which only one of the entities has established first degree contact may be given a relationship status of "second degree." It will be recognized by those skilled in the art, in view of the teachings of the present disclosure, that other manners of assessing relationships between entities within the social media network may be used in addition to, or in the alternative to the foregoing.

Certain embodiments may use a threshold criterion for determining whether the quality of the relationships between the common contacts and the receiving entity are sufficient to overcome a presumption that the communication is a reconnaissance communication. In certain embodiments, this determination may be made at operation 926. In certain embodiments, the threshold criterion may be based on whether the receiving entity has a sufficient number of first degree contacts within the common contacts between the sending entity and receiving entity. In certain embodiments, the threshold requirement may be based on whether the receiving entity has a sufficient number of second degree contacts within the common contacts between the sending entity and receiving entity. In certain embodiments, the threshold requirement may be determined based on the number of first degree contacts and second degree contacts within the common contacts between the sending entity and receiving entity. It will be recognized by those skilled in the art, in view of the teachings of the present disclosure, that additional or alternative manners of establishing the relationship threshold criterion may be employed. In certain embodiments, the communication may be treated as a normal communication with respect to the social media and network analysis at operation 919 if the relationship threshold requirement at operation 926 is met. Otherwise, if the communication fails to pass the relationship threshold criterion at operation 926, certain embodiments may proceed to identify the communication as a potential reconnaissance communication at operation 912.

Figure 10A:
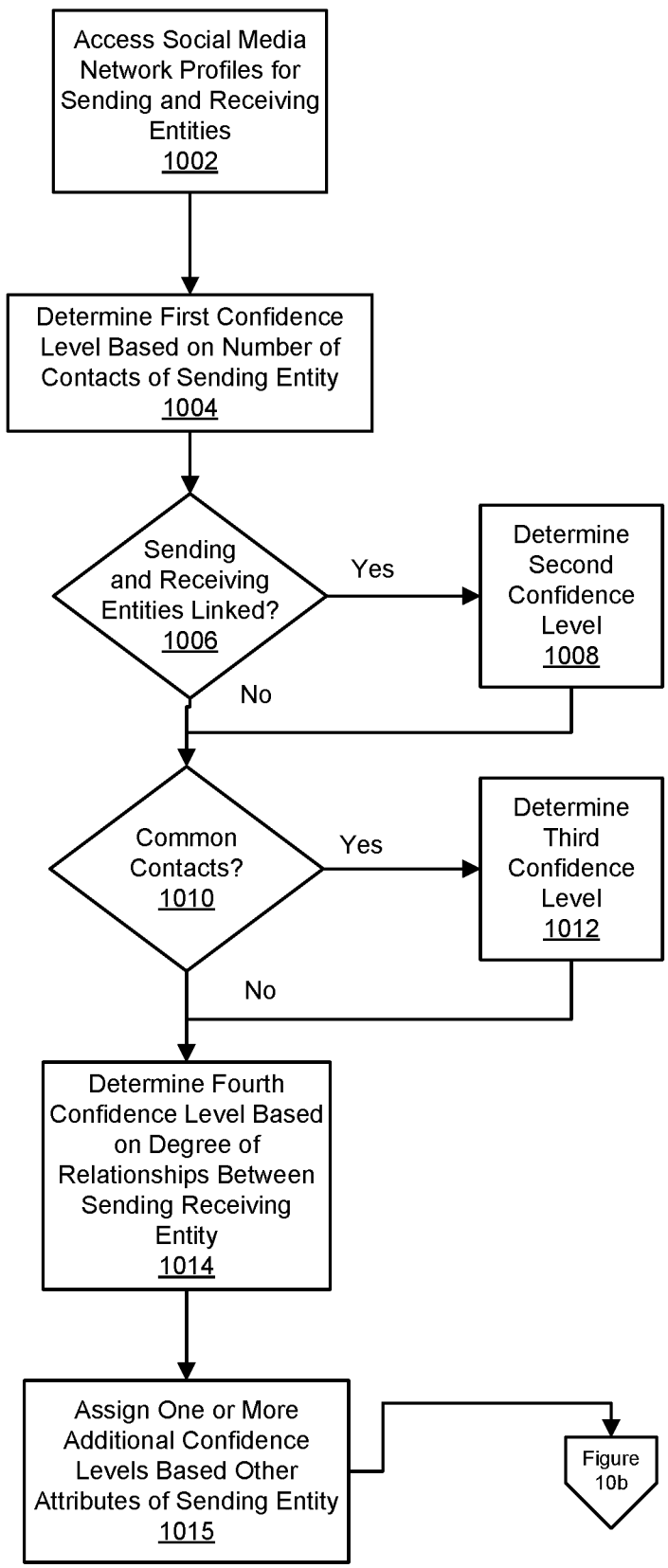
FIGS. 10a and 10b depict operations that may be executed by the reconnaissance identification module.
Figure 10B:
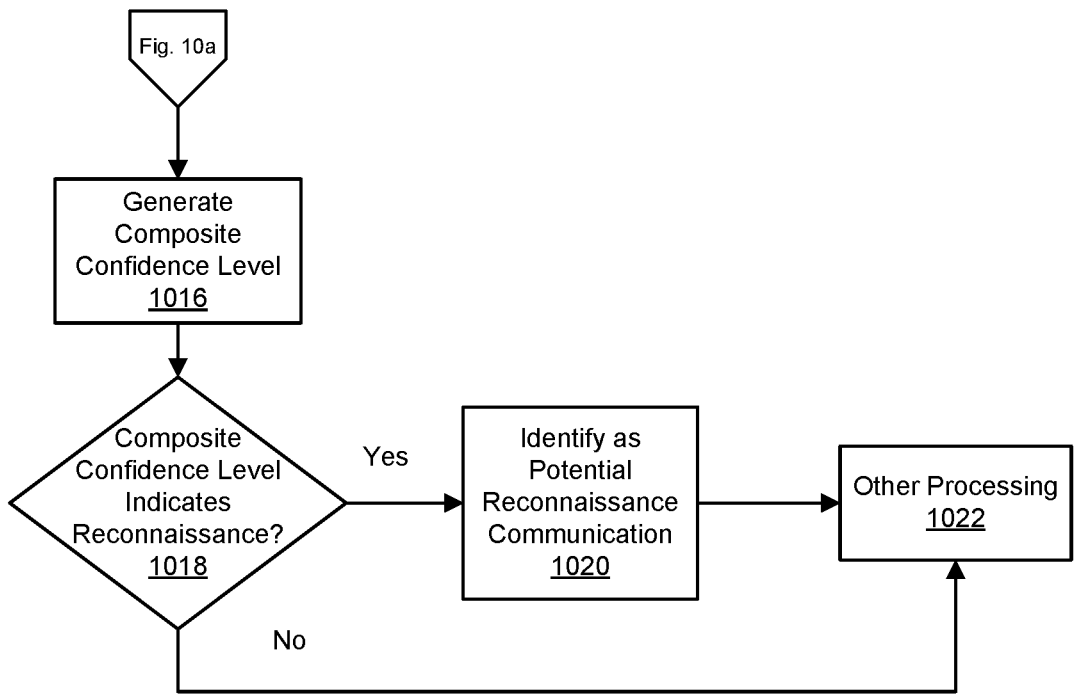

FIGS. 10*a* and 10*b* (collectively referenced as FIG. 10) is a flowchart depicting operations that may be executed by the reconnaissance identification module, where various tests are executed on the received communication to provide one or more confidence levels that the received communication is a reconnaissance communication. In certain embodiments, a value for a confidence level may be assigned based on the likelihood that the received communication is a reconnaissance communication. In certain embodiments, the value for the confidence level may be assigned based on the likelihood that the received communication is not a reconnaissance communication. In certain embodiments, the value for the confidence levels of certain determinations may be assigned positive values, while others are assigned negative values. It will be recognized by those skilled in the art, based on the teachings of the present disclosure, that there are a number of manners of assigning particular values to the confidence levels.

In certain embodiments, the reconnaissance identification module accesses the social media network profiles for the sending and receiving entities at operation 1002. In certain embodiments, a first confidence level is assigned based on the number of contacts established by the sending entity at operation 1004. In certain embodiments, a determination as to whether the sending and receiving entities are linked as contacts within the social media network may be made at operation 1006. Certain embodiments may assign a second confidence level at operation 1008 if the sending and receiving entities are linked as contacts. At operation 1010, common contacts between the sending entity and receiving entity, if any, are accessed. In certain embodiments, a third confidence level may be assigned at operation 1012 based on the number of common contacts.

In certain embodiments, a fourth confidence level may be assigned at operation 1014 based on the degree of relationship between indirect contacts of the sending entity and the receiving entity. In certain embodiments, indirect contacts are not expressly a part of the social media profiles of the sending and receiving entities. In certain embodiments, an API may be used to lookup any indirect relationships between the sending and receiving entities. In certain embodiments, the social media network provider may allow download of the entire social media database, thereby allowing processing of the indirect relationships exterior to the social media network. Based on this information, a determination may be made as to whether the sending and receiving entities have secondary contacts in common to thereby assess the degree of relationship between the entities. It will be recognized by those skilled in the art, based on the present disclosure, that the indirect relationships may be extended beyond secondary contacts to, for example, tertiary contacts, etc.

In certain embodiments, caches and/or analytics scores may be employed to reduce the need to reassess the degree of relationships between the sending and receiving entities. To this end, once the degree of relationship has been determined in response to an initial communication received from the sending entity, the degree of relationship may be stored in the cache and/or converted to an analytics score that is stored with respect to the sending entity. As an example, an assessment of the degree of relationship may be conducted the first time a communication is received from the sending entity. Upon receipt of further communications from the same sending entity, the cache and/or analytics score store may be accessed to determine whether the degree of relationship between the sending and receiving entities meet criterion imposed by a security policy. For example, certain security policies may require first-degree connections between the entities, while other security policies may allow a communication from the sending entity if secondary, indirect connections exist.

In certain embodiments, other factors may be considered and assigned a corresponding confidence level at operation 1015. As an example, other factors that may be used in determining the trustworthiness of the sender may include the length of time that the sender's profile has been active, the geographical region associated with the sender, the company/organization identified in the sender's profile, the sender's social media participation score, etc.

In certain embodiments, one or more of the confidence levels may be used to generate a composite confidence level at operation 1016. In certain embodiments, only a subset of the confidence levels may have been generated based on whether conditions existing at operations 1004, 1006, 1010, and 1015 warranted assignment of a corresponding confidence level, in which case only the subset of confidence levels are considered in generating the composite confidence level. In certain embodiments, the composite confidence level may be generated as a sum of the individual confidence levels. In certain embodiments, the composite confidence level may be generated as a weighted sum of the individual confidence levels. Based on the teachings of the present disclosure, those skilled in the art will recognize that other manners of generating the composite confidence level from the individual confidence levels may be employed.

Certain embodiments may include a system configuration file that defines the parameters used by the reconnaissance dedication module to identify potential reconnaissance system communications. In certain embodiments, the system configuration file may include information used to enable/disable which social profile attribute are to be considered in reconnaissance communication identification operations. Additionally, or on the alternative, the system configuration file may include information used to assign weights that are to be used for one or more of the confidence levels in calculating the composite confidence level.

Certain embodiments make a determination at operation 1018 as to whether the composite confidence level indicates that the communication is a reconnaissance communication. If the composite confidence level is indicative of a reconnaissance communication, it may be identified as such at operation 1020 before the communication is subject to further processing at operation 1022. Otherwise, certain embodiments may proceed to operation 1022 if the composite confidence level is not sufficient to identify communication as a potential reconnaissance communication.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention. Consequently, the invention is intended to be limited only by the spirit and scope of the appended claims, giving full cognizance to equivalents in all respects.

What is claimed is:

1. A computer-implemented method for identifying communications received from potentially untrustworthy entities comprising:
 receiving, via a protected endpoint, an electronic communication for a receiving entity from a sending entity, the protected endpoint comprising an endpoint device and an endpoint agent, the endpoint agent executing on a hardware processor of the endpoint device;
 accessing, via a security analytics system, social media information for the sending entity from a social media network;
 analyzing, via the security analytics system, the social media information of the sending entity pursuant to determining whether the received electronic communication is from a potentially untrustworthy entity;
 determining whether the receiving entity and the sending entity have common contacts in the social media network;
 determining a number of common contacts in the social media network the receiving entity and the sending entity have;
 using a threshold criterion for the number of common contacts to determine whether the sending entity may be trusted;
 assigning a confidence level that the received electronic communication is a communication from a potentially untrustworthy entity when the receiving entity and the sending entity have common contacts in the social media network, wherein the confidence level includes a common contact confidence level, the common contact confidence level being based on a degree of relationship with respect to the receiving entity between any common contacts of the receiving entity and the sending entity in the social media network;
 identifying, via the security analytics system, the electronic communication as a reconnaissance communication using the confidence level that the received electronic communication is from a potentially untrustworthy entity; and,
  executing security mitigation operations on the received electronic communication when the electronic communication is identified as a reconnaissance communication.

2. The method of claim 1, wherein analyzing the social media information of the sending entity comprises one or more of:
 determining whether a social media profile exists on the social media network for the sending entity;
 determining a number of contacts with which the sending entity is associated on the social media network;
 determining whether the receiving entity and the sending entity are linked as contacts in the social media network;
 determining a geographical region of the sending entity;
 determining how long the social media profile has been active; and
 determining a social media participation score for the sending entity.

3. The method of claim 1, further comprising:
 accessing social media data to determine a degree of relationship between the receiving entity and the sending entity; and
 analyzing the degree of relationship between the receiving entity and sending entity pursuant to determining whether the received electronic communication is from a potentially untrustworthy entity.

4. The method of claim 1, wherein analyzing social media information comprises:
assigning a weighted confidence level that the received electronic communication is a communication from a potentially untrustworthy entity, wherein the weighted confidence level includes one or more of:
a first confidence level determined from a number of contacts with which the sending entity is associated;
a second confidence level based on whether the receiving entity and the sending entity are linked as contacts in the social media network;
a third confidence level based on whether the receiving entity and the sending entity have common contacts in the social media network;
a fourth confidence level based on how long a social media profile of the sending entity has existed in the social media network;
a fifth confidence level based on a geographic region associated with the social media profile of the sending entity;
a sixth confidence level based on an organization with which the sending entity is associated;
a seventh confidence level based on a social media participation score of the sending entity; and
determining a composite confidence level using one or more of the first, second, third, fourth, fifth, sixth, or seventh confidence levels.

5. The method of claim 4, wherein
the composite confidence level is determined using weighted values for one or more of the first, second, third, and fourth confidence levels.

6. The method of claim 1, wherein the electronic communication comprises an email; and
the analysis of the social media information of the sending entity is used to determine whether the email is a phishing email.

7. The method of claim 1, further comprising:
executing the security mitigation operations on the received electronic communication when the analysis of the social media information of the sending entity indicates that the received electronic communication is from a potentially untrustworthy entity, wherein the security mitigation operations comprise one or more of:
quarantining the received electronic communication;
sandboxing the received electronic communication;
communicating a notification to a security administrator that a suspicious communication has been received by the receiving entity; and
communicating a notification to the receiving entity that a suspicious communication has been received for the receiving entity.

8. The method of claim 1, further comprising:
executing one or more further detection operations in addition to analyzing the social media information of the sending entity to determine whether the received electronic communication is received from a potentially untrustworthy entity, wherein the one or more further detection operations include one or more operations comprising:
determining whether the received electronic communication includes malware;
determining whether the received electronic communication originated from an untrusted domain or sender;
determining whether the received electronic communication includes a hyperlink to an unknown and/or untrusted domain or sender; and
determining whether the received electronic communication corresponds to a known reconnaissance communication campaign.

9. The method of claim 1, further comprising:
if the received electronic communication is from a potentially untrustworthy entity, using the received electronic communication to assess a degree of risk associated with the receiving entity.

10. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving, via a protected endpoint, an electronic communication for a receiving entity from a sending entity, the protected endpoint comprising an endpoint device and an endpoint agent, the endpoint agent executing on a hardware processor of the endpoint device;
accessing, via a security analytics system, social media information for the sending entity from a social media network;
analyzing, via the security analytics system, the social media information of the sending entity pursuant to determining whether the received electronic communication is from a potentially untrustworthy entity;
determining whether the receiving entity and the sending entity have common contacts in the social media network;
determining a number of common contacts in the social media network the receiving entity and the sending entity have;
using a threshold criterion for the number of common contacts to determine whether the sending entity may be trusted;
assigning a confidence level that the received electronic communication is a communication from a potentially untrustworthy entity when the receiving entity and the sending entity have common contacts in the social media network, wherein the confidence level includes a common contact confidence level, the common contact confidence level being based on a degree of relationship with respect to the receiving entity between any common contacts of the receiving entity and the sending entity in the social media network;
identifying, via the security analytics system, the electronic communication as a reconnaissance communication using the confidence level that the electronic communication is from a potentially untrustworthy entity; and,
executing security mitigation operations on the received electronic communication when the electronic communication is identified as a reconnaissance communication.

11. The system of claim 10, wherein analyzing the social media information of the sending entity comprises one or more of:
determining whether a social media profile exists on the social media network for the sending entity;
determining a number of contacts with which the sending entity is associated on the social media network;

determining whether the receiving entity and the sending entity are linked as contacts in the social media network;
determining a geographical region of the sending entity;
determining a social media participation score for the sending entity; and
determining how long the social media profile has been active.

12. The system of claim 10, further comprising:
accessing social media information to determine a degree of relationship between the receiving entity and the sending entity; and
analyzing the degree of relationship between the receiving entity and sending entity pursuant to determining whether the received electronic communication is from a potentially untrustworthy entity.

13. The system of claim 10, wherein analyzing the social media information comprises:
assigning a weighted confidence level that the received electronic communication is a communication from a potentially untrustworthy entity, wherein the weighted confidence level includes one or more of:
a first confidence level determined from a number of contacts with which the sending entity is associated;
a second confidence level based on whether the receiving entity and the sending entity are linked as contacts in the social media network;
a third confidence level based on whether the receiving entity and the sending entity have common contacts in the social media network;
a fourth confidence level based on how long a social media profile of the sending entity has existed in the social media network;
a fifth confidence level based on a geographic region associated with the social media profile of the sending entity;
a sixth confidence level based on an organization with which the sending entity is associated;
a seventh confidence level based on a social media participation score of the sending entity; and
determining a composite confidence level using one or more of the first, second, third, fourth, fifth, sixth, or seventh confidence levels.

14. The system of claim 13, wherein
the composite confidence level is determined using weighted values for one or more of the first, second, third, and fourth confidence levels.

15. The system of claim 10, wherein the electronic communication comprises an email; and
the analysis of the social media information of the sending entity is used to determine whether the email is a phishing email.

16. The system of claim 10, further comprising:
executing the security mitigation operations on the received electronic communication when the analysis of the social media information of the sending entity indicates that the received electronic communication is from a potentially untrustworthy entity, wherein the security mitigation operations comprise one or more of:
quarantining the received electronic communication;
sand boxing the received electronic communication;
communicating a notification to a security administrator that a suspicious communication has been received by the receiving entity; and
communicating a notification to the receiving entity that a suspicious communication has been received for the receiving entity.

17. The system of claim 10, further comprising:
executing one or more further detection operations in addition to analyzing the social media information of the sending entity to determine whether the received electronic communication is received from a potentially untrustworthy entity, wherein the one or more further detection operations include one or more operations comprising:
determining whether the received electronic communication includes malware;
determining whether the received electronic communication originated from an untrusted domain or sender;
determining whether the received communication includes a hyperlink to an unknown and/or untrusted domain or sender; and
determining whether the received electronic communication corresponds to a known reconnaissance communication campaign.

18. The system of claim 10, further comprising:
if the received electronic communication is from a potentially untrustworthy entity, using the received electronic communication to assess a degree of risk associated with the receiving entity.

19. A non-transitory, computer-readable storage medium embodying computer program code, the computer program code comprising computer executable instructions configured for:
receiving, via a protected endpoint an electronic communication for a receiving entity from a sending entity, the protected endpoint comprising an endpoint device and an endpoint agent, the endpoint agent executing on a hardware processor of the endpoint device;
accessing, via a security analytics system, social media information for the sending entity from a social media network;
analyzing, via the security analytics system, the social media information of the sending entity pursuant to determining whether the received electronic communication is from a potentially untrustworthy entity;
determining whether the receiving entity and the sending entity have common contacts in the social media network;
determining a number of common contacts in the social media network the receiving entity and the sending entity have;
using a threshold criterion for the number of common contacts to determine whether the sending entity may be trusted;
assigning a confidence level that the received electronic communication is a communication from a potentially untrustworthy entity when the receiving entity and the sending entity have common contacts in the social media network, wherein the confidence level includes a common contact confidence level, the common contact confidence level being based on a degree of relationship with respect to the receiving entity between any common contacts of the receiving entity and the sending entity in the social media network;
identifying, via the security analytics system, the electronic communication as a reconnaissance communication using the confidence level that the received electronic communication is from a potentially untrustworthy entity; and, executing security mitigation operations on the received electronic communication when the electronic communication is identified as a reconnaissance communication.

20. The non-transitory, computer-readable storage medium of claim 19, wherein analyzing the social media information of the sending entity comprises one or more of:
   determining whether a social media profile exists on the social media network for the sending entity;
   determining a number of contacts with which the sending entity is associated on the social media network;
   determining whether the receiving entity and the sending entity are linked as contacts in the social media network;
   determining a degree of relationship between any common contacts of the receiving entity and the sending entity;
   determining a geographical region of the sending entity;
   determining a social media participation score for the sending entity; and
   determining how long the social media profile has been active.

21. The non-transitory, computer-readable storage medium of claim 19, wherein the electronic communication comprises an email; and
   the analysis of the social media information of the sending entity is used to determine whether the email is a phishing email.

22. The non-transitory, computer-readable storage medium of claim 19, further comprising:
   executing security mitigation operations on the received electronic communication when the analysis of the social media information of the sending entity indicates that the received electronic communication is from a potentially untrustworthy entity,
      wherein the security mitigation operations comprise one or more of:
         quarantining the received electronic communication;
         sand boxing the received electronic communication;
         communicating a notification to a security administrator that a suspicious communication has been received by the receiving entity; and
   communicating a notification to the receiving entity that a suspicious communication has been received for the receiving entity.

* * * * *